United States Patent [19]

Morris

[11] 4,045,935

[45] Sept. 6, 1977

[54] METAL CASED REFRACTORY AND METHOD OF MAKING SAME

[75] Inventor: Frank E. Morris, Collegeville, Pa.

[73] Assignee: Kaiser Aluminum & Chemical Corporation, Oakland, Calif.

[21] Appl. No.: 723,392

[22] Filed: Sept. 15, 1976

[51] Int. Cl.² .......................... E04B 5/04; E04C 2/04; B23K 31/02

[52] U.S. Cl. .................................... 52/599; 29/469.5; 29/514; 29/515

[58] Field of Search .............. 29/515, 514, 509, 469.5, 29/243.5, 243.57; 52/598, 599

[56] References Cited

U.S. PATENT DOCUMENTS

| | | | |
|---|---|---|---|
| 1,950,223 | 3/1934 | Budd | 29/515 X |
| 2,718,199 | 9/1955 | Curioni | 29/515 X |
| 2,797,448 | 7/1957 | Revell et al. | 52/599 X |
| 3,168,917 | 2/1965 | Bartels | 29/515 X |
| 3,280,772 | 10/1966 | Burklo | 52/599 X |
| 3,314,142 | 4/1967 | Jenkins et al. | 29/515 X |
| 3,315,430 | 4/1967 | Reynolds et al. | 52/599 |
| 3,317,992 | 5/1967 | Kerr | 52/599 X |
| 3,577,626 | 5/1971 | Link | 29/515 X |
| 3,597,892 | 8/1971 | Farrington | 52/599 |
| 3,781,962 | 1/1974 | Norris et al. | 29/243.57 |

FOREIGN PATENT DOCUMENTS

| | | | |
|---|---|---|---|
| 878,204 | 8/1971 | Canada | 29/469.5 |

*Primary Examiner*—Charlie T. Moon
*Attorney, Agent, or Firm*—Paul E. Calrow; Malcolm McQuarrie

[57] ABSTRACT

A metal cased refractory is made by first forming a refractory shape, which may be fired if desired, with at least one, and preferably two, shallow depressions in one of its faces. A U-shaped metal casing is also formed having a discontinuous slot running the length of its central portion. The U-shaped casing is then placed over the refractory shape so that the discontinuities in the slot overlie the shallow depressions. These discontinuities form contraction tabs which are pushed into the shallow depressions, drawing the side legs of the U-shaped casing snugly against the sides of the refractory shape and placing the central section of the casing in tension.

12 Claims, 9 Drawing Figures

METAL CASED REFRACTORY AND METHOD OF MAKING SAME cBACKGROUND OF THE INVENTION

This invention concerns refractory shapes, and particularly shapes which are metal cased.

Metal cased refractories are well known in the art. One way of attaching metal cases or plates to a refractory is to comold the refractory and casing. In this way, tangs or anchors attached to the metal can be embedded in the refractory shape when it is pressed, for example, as set forth in U.S. Pat. No. 2,673,373. However, this co-molding method can only be used for unfired or chemically bonded brick, and cannot be used when the metal is to be attached to a brick after it has been fired. (Obviously one cannot fire a brick after a metal casing hs been attached, since this would destroy the casing.)

Various methods have been proposed to attach metal casings to fired brick. For example, U.S. Pat. No. 3,083,453 discloses a method of placing a U-shaped metal casing over three sides of a preformed brick and dimpling portions of the edge of the metal into preformed recesses in the brick. U.S. Pat. No. 2,736,187 discloses a method of placing two U-shaped metal casings over a brick and attaching them together by welding. However, both these methods require rather accurate forming of the metal casings, and may present problems if the dimensions of the brick vary somewhat, for example because of variations in the firing shrinkage.

Various solutions to the problem of fitting casings to brick which may vary slightly in dimension have been proposed. For example, U.S. Pat. No. 3,150,466 discloses a method of wrapping a sheet of metal, which has score lines at the bend points, around the brick, the two ends of the metal being fastened together by staples. However, this method requires rather complicated apparatus. Another method requiring fairly complicated apparatus is that disclosed in U.S. Pat. No. 3,261,738, where individual metal plates are glued to the sides of a refractory shape.

One way of overcoming this problem of fit between the casing and the refractory is disclosed in U.S. Pat. No. 3,287,872, where four L-shaped metal sections are placed on a single brick and held together by welding. However, this does lead to a double thickness of metal on the brick.

Another method of solving the problem of a tight fit between the metal casing and a refractory shape is set forth in British Pat. No. 1,032,130, where a preformed refractory shape is placed within a tubular metal casing with a layer of compressible material between the refractory and the metal casing. The casing is then tightened by depressing a longitudinal portion of the casing into recesses in the compression material or, if desired, into recesses in the refractory itself.

In summary, although many methods of attaching metal casings to preformed refractory shapes have been proposed, none is completely satisfactory in all instances, and the industry still searches for a better method of attaching a metal casing tightly to a preformed shape. The present invention is directed to solving this problem of tight attachment when there are slight variations in the size of the refractory shape due, for example, to variations in firing shrinkage.

SUMMARY OF THE INVENTION

It has now been found, according to this invention, that a tight-fitting metal casing can be applied to a preformed refractory shape by (1) forming a refractory shape with (a) a first face, (b) two adjacent opposed end faces, (c) two adjacent opposed side faces, and (d) at least one shallow discontinuous depression, small in area compared to the area of the first face, lying wholly within a central portion of the first face; (2) forming a U-shaped metal casing with (a) a central portion having two end edges and two side edges, the central portion between the two side edges being slightly wider than the width of the first face of the refractory shape between its side faces, (b) two leg portions adjacent the side edges of the central portion, the leg portions extending at least 1 cm from their junction with the central portion, and (c) at least one discontinuous slot running the length of the central portion between the two end edges; (3 ) placing the metal casing on the refractory shape so the central portion of the casing closely overlies the first face of the shape, the legs of the casing overlying the two side faces of the shape, and at least one discontinuity in the slot overlying at least one shallow depression in the shape; and (4) depressing the discontinuity overlying the shallow depression into the depression, whereby the side legs of the metal casing are drawn closely against the side faces of the shape and the central portion of the casing is placed in tension.

DETAILED DESCRIPTION

Figure 1:
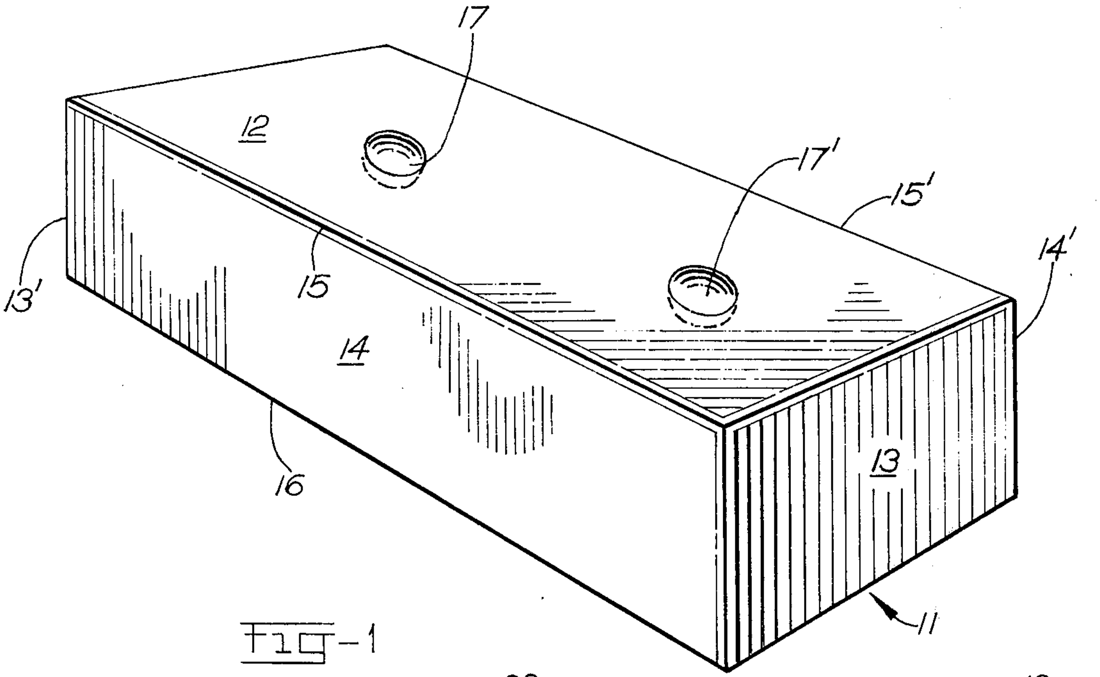
FIG. 1 is a perspective of a refractory shape used in the practice of this invention.

The refractory shape may be, as illustrated in FIG. 1, a rectangular shape 11 with a first face 12, adjacent opposed end faces 13 and 13', adjacent opposed side faces 14 and 14', and a sixth face 16 opposed to first face 12. In the central portion of face 12 is located at least one dimple and preferably, as shown in FIG. 1, at least two such dimples, 17 and 17'. These dimples are shallow discontinuous depressions in the face of the refractory shape of small depth compared to the thickness of the shape. Generally, these will be located along the central longitudinal midline of face 12, althrough they can be located elsewhere.

While whape 11 can be unfired, the principal advantages of the invention are obtained when it is fired.

Although shape 11 shown in FIG. 1 is rectangular, it will be understood that other forms can be used. For example, faces 12 and 16 need not be parallel, but may converge towards each other to form a tapered shape. Likewise faces 13 and 13' need not be parallel, nor need they be perpendicular to face 12 or any of the other faces of the shape. On the other hand, the intersections of faces 14 and 14' with face 12, that is to say edges 15 and 15', will generally be substantially parallel, since if they converge to any extent there will be a tendency for the metal casing to slide off the end of the brick. Likewise the internal angles between face 12 and faces 14 and 14', 20 and 20' in FIG. 4, will not be greater than 90°. In other words, faces 14 and 14' can converge downwardly towards face 16, and the metal casing will have no tendency to slide off the shape, but a divergence going toward face 16 would make attachment of the casing most insecure.

It will be understood that shape 11 can be made of any type of refractory material, although this invention will find most application in the metal casing of basic bricks, for example bricks made of magnesia and chrome ore.

Figure 2:
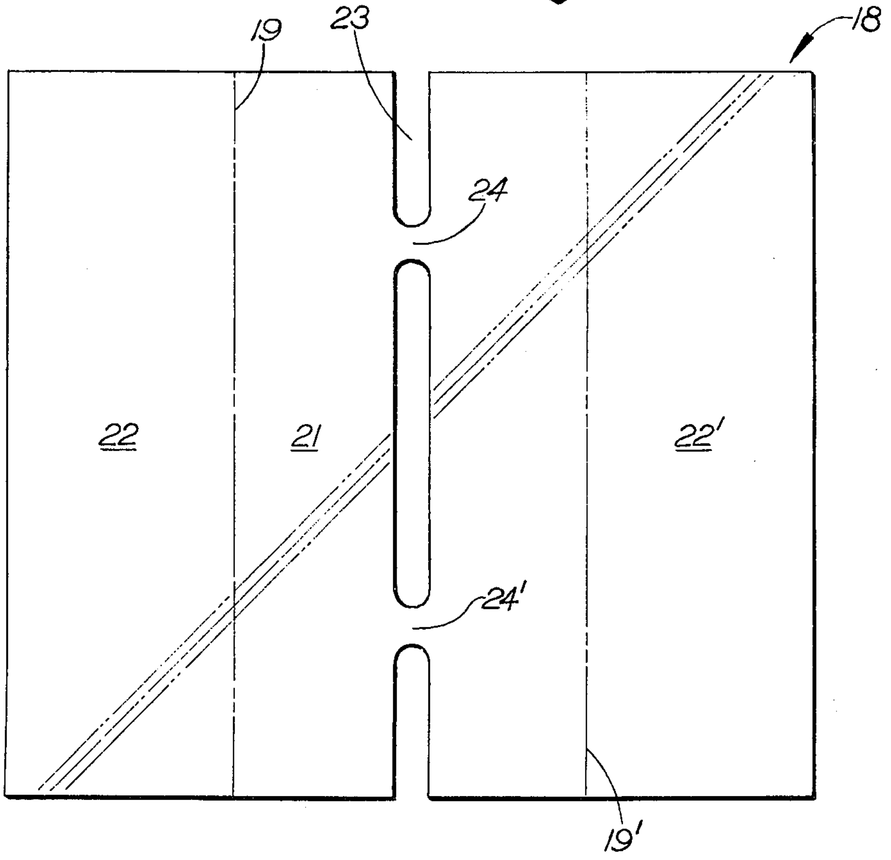
FIG. 2 is a plan view of a metal casing blank before it is bent into U-shape.

FIG. 2 illustrates a metal blank 18 from which the U-shaped metal casing is formed by bending. Dashed lines 19 and 19' indicate bend fold-lines and divide the blank into a central portion 21, which will form the base of the U, and side portions 22 and 22', which will form the legs of the U. A discontinuous slot 23 runs the length of the blank, the discontinuities in the slot forming contraction tabs 24 and 24'. Again, slot 23 will generally run along the central longitudinal axis of the central portion of the U-shaped casing, but may be located elsewhere. However, in any case, when central portion 21 is placed over face 12 of shape 11, contraction tabs 24 and 24' will lie over dimples 17 and 17'.

The metal casing may be made of any desired metal, but will generally be made of steel, most particularly mild steel, and of a gauge ranging from 16 to 26, although other thicknesses may be used.

The width of legs 22 and 22' will be such that these extend a substantial distance over side faces 14 and 14'. By a substantial distance is meant a distance adequate to provide proper anchoring of the metal casing on the shape, for example a distance of at least 1 cm across side faces 14 and 14' from face 12. Of course, side legs 22 and 22' can extend the full depth of side faces 14 and 14', as shown. Likewise, in general the metal casing will extend substantially the full length of shape 11, but need not. Obviously, it is essential that the length of the metal casing be sufficient to cover the distance between two depressions 17 and 17'.

Figure 3:
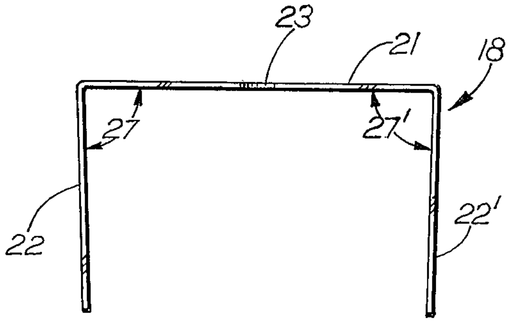
FIG. 3 is an end view of a U-shaped metal casing.

FIG. 3 illustrates the metal casing after blank 18 has been bent so that legs 22 and 22' are substantially at right angles to central portion 21. In practice, it is preferred that side legs 22 and 22' be "overbent" so that internal angles 27 and 27' between side legs 22 and 22' and central portion 21 are slightly less than 90°. The effect of this is that, when the metal casing is placed on the brick, side legs 22 and 22' are forced slightly outward, thus tending to grip the refractory shape even more firmly.

Figure 4:
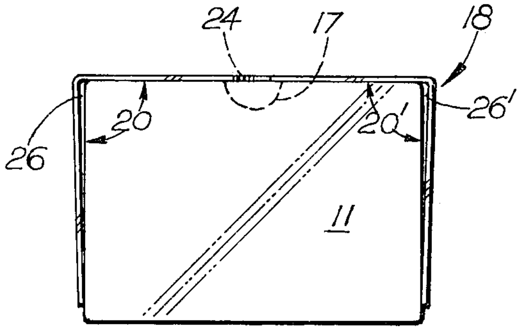
FIG. 4 is an end view of the metal casing of FIG. 3 placed on a refractory shape, but before being firmly attached thereto.

FIG. 4 illustrates the assembly of shape 11 and metal casing 18 before contraction tabs 24 and 24' have been depressed into dimples 17 and 17'. FIG. 4 also illustrates how casing 18 can be bent to a slightly oversize dimension to allow for slight variations in the width of shape 11, this oversizing resulting in gaps 26 and 26'.

Figure 5:
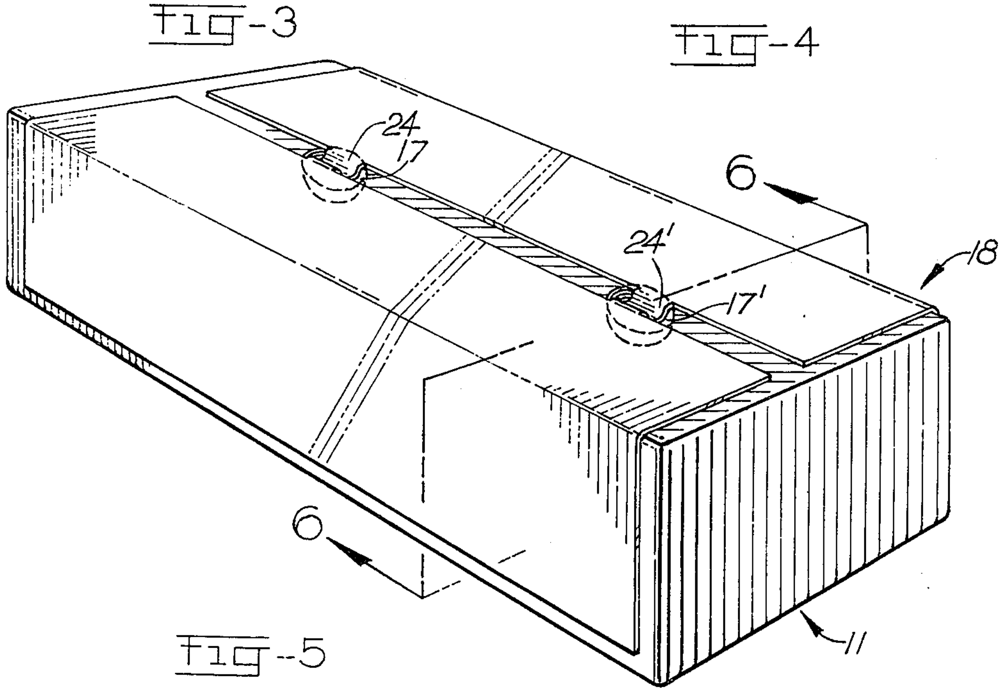
FIG. 5 is a perspective assembly view of one embodiment of this invention with the metal plate attached to the refractory shape.
Figure 6:
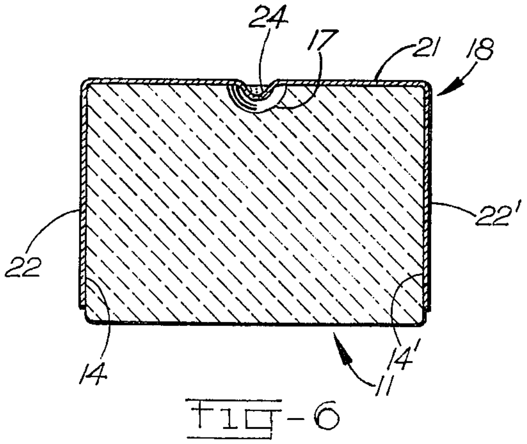
FIG. 6 is a sectional view along the line 6--6 of FIG. 5.

FIG. 5 is a view of the assembly after contraction tabs 24 and 24' have been depressed into dimples 17 and 17', and FIG. 6 is a sectional view along the line 6—6 of FIG. 5, showing how side legs 22 and 22' have been pulled snugly up against side faces 14 and 14', placing central portion 21 in tension and firmly attaching metal casing 18 to shape 11.

While contraction tabs 24 and 24' can be depressed into dimples 17 and 17' by any of several means, for example by using a nail set and hammer, generally the assembly will be made on automated or semi-automated apparatus which places the U-casing on the refractory shape, holds it in place, and depresses the contraction tabs into the recesses by mechanical or hydraulic pressure or plungers.

If desired for extra security in attaching the casing to the shape, glue may be placed between the casing and the shape before thay are attached.

Figure 7:
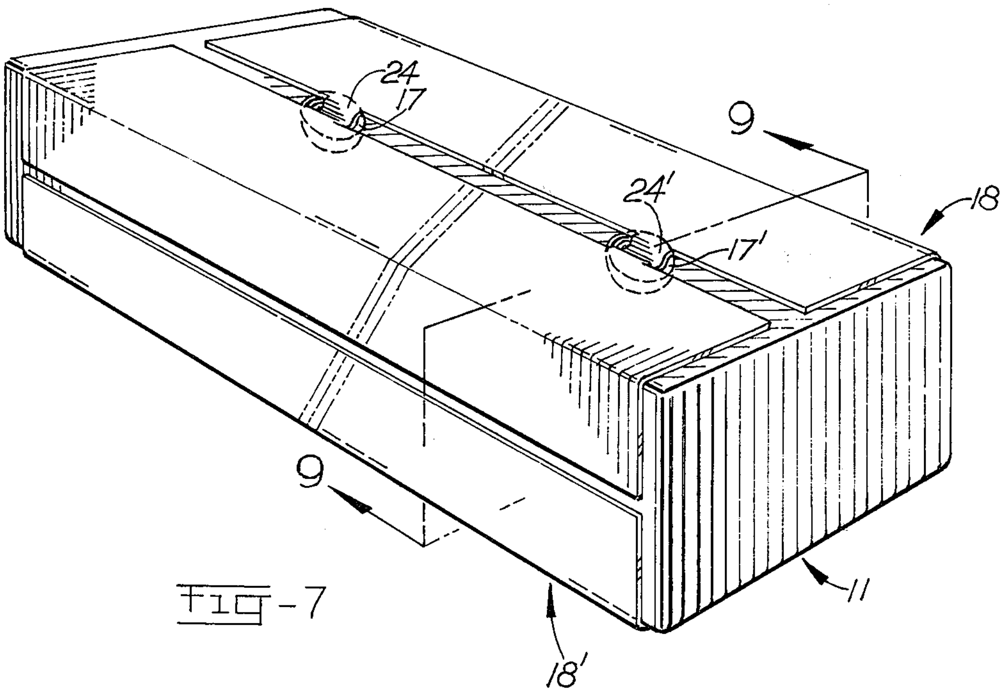
FIG. 7 is a perspective view of another embodiment of the invention, using two U-shaped casings.

FIG. 7 illustrates an alternative embodiment of the invention wherein the refractory shape is covered with the U-shaped casings 18 and 18'. Each of these U-shaped casings is formed and attached to refractory shape 11 as previously described for a single casing. Of course, shape 11 has two dimples 17'' and 17''' on its sixth face 16.

Figure 8:
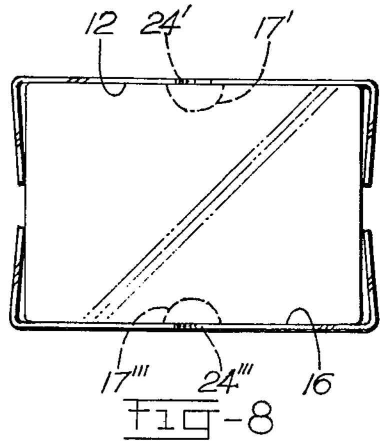
FIG. 8 is an end view of the assembly shown in FIG. 7, but before tight attachment of the metal casings.
Figure 9:
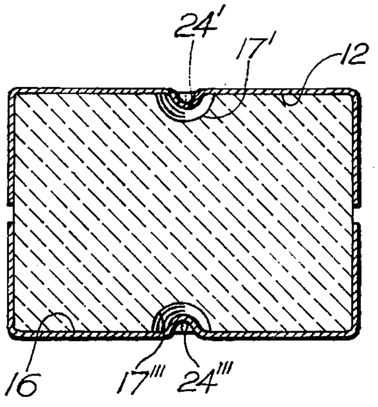
FIG. 9 is a sectional view along the line 9--9 of FIG. 7.

FIG. 8 is an end view of the embodiment shown in FIG. 7 prior to depressing contraction tabs 24, 24', 24'', and 24''' into the corresponding recesses. FIG. 9 is a sectional view along the line 9—9 of FIG. 7, and shows contraction tabs 24' and 24''' depressed into the corresponding shallow depressions.

What is claimed is:

1. A metal cased refractory comprising: (1) a preformed refractory shape having (a) a first face, (b) two opposed end faces adjacent the first face, and (c) two opposed side faces adjacent the first face, the first face having at least one preformed, shallow, discontinuous depression of small area compared to the area of the first face and lying wholly within a central portion of the first face, and (2) a U-shaped metal casing having (a) a central portion extending over the width of the first face between the two side faces and (b) two side legs extending a significant distance over each side face from its juncture with the first face, the central portion of the metal casing having a slot extending between the two end faces, the slot having at least one discontinuity overlying at least one depression in the first face of the refractory shape, the metal of said discontinuity being displaced from the plane of the central portion of the metal casing and disposed within the depression, whereby the metal of the central portion is placed in tension and the side legs of the U-shaped casing are held closely against the side faces of the preformed shape.

2. Metal cased refractory according to claim 1 wherein the metal casing is of steel.

3. Metal cased refractory according to claim 1 wherein the preformed refractory shape is a fired shape.

4. Metal cased refractory according to claim 1 wherein the side legs of the U-shaped metal casing extend at least 1 cm over the side faces of the refractory shape.

5. Metal cased refractory according to claim 1 wherein there are two discontinuities in the slot and two depressions in the refractory shape.

6. Metal cased refractory according to claim 1 wherein the U-shaped metal casing extends substantially the full length of the first face of the refractory shape between the two end faces.

7. Metal cased refractory according to claim 1 wherein the two side legs of the U-shaped metal casing cover substantially all the two side faces.

8. Metal cased refractory according to claim 1 wherein the side legs of the U-shaped metal casing cover substantially half of each side face.

9. Metal cased refractory according to claim 8 having a sixth face opposed to the first face, the sixth face having at least one shallow depression similar to that in the first face and a second U-shaped metal casing similar to that overlying the first face.

10. Method of attaching a metal casing to a refractory shape comprising: (1) forming a refractory shape with (a) a first face, (b) two adjacent opposed end faces, (c) two adjacent opposed side faces, and (d) at least one shallow discontinuous depression, small in area compared to the area of the first face, lying wholly within a central portion of the first face; (2) forming a U-shaped metal casing with (a) a central portion having two end edges and two side edges, the central portion between the two side edges being slightly wider than the width of the first face of the refractory shape between its side faces, (b) two leg portions adjacent the side edges of the central portion, the leg portions extending at least 1 cm from their junction with the central portion, and (c) at least one discontinuous slot running the length of the central portion between the two end edges; (3) placing the metal casing on the refractory shape so the central portion of the casing closely overlies the first face of the shape, the legs of the casing overly the two side faces of the shape, and at least one discontinuity in the slot overlies at least one shallow depression in the shape; and (4) depressing the discontinuity overlying the shallow depression into the depression, whereby the side legs of the metal casing are drawn closely against the side faces of the shape and the central portion of the casing is placed in tension.

11. Method according to claim 10 wherein glue is placed between the casing and the shape before the casing is placed on the shape.

12. Method according to claim 10 wherein the legs of the metal casing are overbent so that the internal angles between the legs and the central portion are slightly less than 90°.

* * * * *